United States Patent [19]
Maus et al.

[11] Patent Number: 5,512,221
[45] Date of Patent: Apr. 30, 1996

[54] LENS THICKNESS ADJUSTMENT METHOD AND APPARATUS IN A THERMOPLASTIC INJECTION MOLD FOR OPHTHALMIC FINISHED SPECTACLE LENSES

[75] Inventors: Steven M. Maus, Osseo; George J. Galic, Columbia Heights, both of Minn.

[73] Assignee: Galic Maus Ventures, Columbia Heights, Minn.

[21] Appl. No.: 363,066

[22] Filed: Dec. 22, 1994

[51] Int. Cl.$^6$ ...................................................... B29D 11/00
[52] U.S. Cl. ............................ 264/2.5; 264/2.2; 264/40.5; 425/150; 425/808
[58] Field of Search ........................... 264/2.2, 2.5, 40.1, 264/40.5; 425/808, 150

[56] References Cited

U.S. PATENT DOCUMENTS

| | | |
|---|---|---|
| 4,008,031 | 2/1977 | Weber . |
| 4,184,835 | 1/1980 | Talbot . |
| 4,364,878 | 12/1982 | Laliberte . |
| 4,664,854 | 5/1987 | Bakalar . |
| 4,778,632 | 10/1988 | Bakalar ..................................... 264/2.2 |
| 4,793,953 | 12/1988 | Maus . |
| 4,828,769 | 5/1989 | Maus . |
| 4,900,242 | 2/1990 | Maus . |
| 4,933,119 | 6/1990 | Weymouth, Jr. . |
| 5,376,317 | 12/1994 | Maus . |

FOREIGN PATENT DOCUMENTS 61-66623 4/1986 Japan .

*Primary Examiner*—Mathieu D. Vargot

[57] ABSTRACT

Method and apparatus for lens thickness adjustment in injection molding of thermoplastic vision-corrective spectacle lenses without manual addition or removal of shims, of inserts or of any other mold part. Thickness adjustment can be made quickly while the lens mold is kept at very hot operating temperatures, yet minimal risk of burning the operator. A rotatable adjustment head is mounted externally onto the mold's operator side, and manually-driven rotation turns a threaded screw which moves one wedge block of a slideably mated pair of opposing wedge blocks in a plane parallel to the parting line, thus moving the opposing wedge block axially forward or back perpendicular to the parting line, but always retaining proper alignment and loadbearing support of optical inserts, even in multicavity injection-compression molding. After many re-polishings of inserts, lens thickness specifications are still maintained without needing shims. This permits use of circulating heat transfer fluids internally within the inserts, to greatly reduce cycle times, yet have minimal fluid leakage problems.

17 Claims, 3 Drawing Sheets

Comparative Example

LENS THICKNESS ADJUSTMENT METHOD AND APPARATUS IN A THERMOPLASTIC INJECTION MOLD FOR OPHTHALMIC FINISHED SPECTACLE LENSES

FIELD OF THE INVENTION

The field of the present invention is improved method and apparatus for injection molding of thermoplastic optical lenses. Most specifically, these improved methods and apparatus for adjustable control of precise lens thickness of a "FSV" finished single vision (wherein both the front and the back lens surfaces & thicknesses therebetween are unchanged from time of demolding to being inserted into a spectacle frame) lens design comprising a series of varying optical magnifying/demagnifying powers of ophthalmic vision corrective spectacle lenses (commonly known as "Rx spectacle lens") are especially well-adapted to multicavity injection-compression molding.

BACKGROUND OF THE INVENTION

Major shifts in market trends and market share have occurred in the last ten years, with the emergence of "thin and light" Rx spectacle lenses. "Thin" is important to having an attractive appearance for the spectacle wearer (specifically avoiding the undesirable "coke bottle lens" image of wearers of high minus power/demagnifying/myopic prescription lenses for correction of their near-sightedness). "Light" is important because the average spectacle frame places two-thirds of the combined weight of the frame plus lens onto the bridge of the nose, and the greater the weight, the more uncomfortable to the wearer.

This trend to "thin and light" is specifically why in the U.S., glass Rx spectacle lenses now constitute less than 20% market share, and the fastest growing segment is polycarbonate thermoplastic injection molded lens, at center thicknesses ranging from 1.0–1.5 mm, when measured at the optical center in a high minus power lens (in contrast to standard "hard resin" thermoset cast CR-39 lens which cannot safely pass FDA lens safety impact tests at thicknesses much less than 2.0 mm). Because of consumer awareness of "thin and light" benefits, lens product advertising and promotion now prominently features the lens' thickness, so accordingly manufacturing QC practices must accurately measure and control the lens thickness, most commonly now to a plus or minus 0.1 mm tolerance from the nominal advertised value. (Only a dozen years ago, it was not possible to buy Rx FSV thinner than 2.0 mm in U.S.A.).

However, to do this desirable control of lens thickness while managing a production schedule of some 300 or more different combinations of magnifying or demagnifying power with astigmatic power (employing, in turn, mold cavities of hundreds of different convex and concave optically polished mold inserts) has turned out to be a major problem. Typically, such convex and concave lens mold inserts were originally made to a very precise dimensional tolerance themselves. Then, pairing up 1 each of these convex and concave lens mold inserts within each injection mold cavity could thereby assure that the resulting injection molded thermoplastic Rx spectacle lens' thickness will be within dimensional tolerances. However, as a matter of practical operation, when these optically polished mold inserts become scratched or flawed in their optical polished surfaces, the common practice of abrasively lapping/repolishing such scratches removes metal from the original insert, thus reducing its thickness or height dimension. Since such repairs are common and inevitable in the current practice, due to handling damage putting the inserts into and out of the moldsets to change the optical powers of the resulting molded lenses, soon the original inventory of optically polished mold inserts has randomly changed in their thicknesses.

Refer to FIG. 5, "Comparative Example", which shows in cross-sectional view a "prior art" lens mold cavity. Most commonly, the answer has been to place a shim (#27) behind each insert to compensate for its thickness reduction vs. original dimensions. Thus, each time a mold cavity is assembled becomes 1 or more iterations of finding the right combination of shims to assemble with any given pair of convex & concave inserts, to make the lens thickness and power to come out right. Alternatively, thick plating can be put onto either front or back faces of the insert to compensate for its thickness reduction from repair work, then re-grind to size. Both "plating up/regrinding" and assembly with shims have cost and convenience disadvantages which are overcome by the present invention.

Even if somehow all original insert thicknesses met the nominal tolerances and even if there never was any repair or alteration of those dimensions, the conventional means for injection compression molding of such Rx spectacle lenses, with few exceptions, have any provision for reproducible control and predictible settings to assure that the resulting lens thicknesses will stay within the required tolerance of the advertised nominal thickness (most specifically, to be able to hold plus or minus 0.1 mm thickness variation from nominal values, over the full range of differing optical powered lenses to be molded in such a moldset).

PRIOR ART

For reasons spelled out in the prior art patents in the field, standard injection molding makes unacceptably flawed Finished Single Vision series of polycarbonate Rx spectacle lenses, most specifically creating "knitlines" in minus-powered lenses. That is why the only relevant process is various forms of injection-compression molding "hybrid process", so the prior art patents in injection-compression molding of thermoplastic Rx spectacle lenses will now be reviewed, with a view for how to reproducibly assure the resulting molded lenses are within the thickness tolerance of the nominal values. Of these prior art patents, Laliberte (U.S. Pat. No. 4,364,878) is believed to be the first commercially significant of such patents, as it is believed to be the method employed by Gentex, who introduced the first commercially successful line of such Finished Single Vision series of polycarbonate Rx spectacle lenses (however this lens series was of a "industrial safety" thickness of at least 3.0 mm, or greater than twice the thickness of today's "thin and light" polycarbonate Rx spectacle lenses). Refer to Laliberte column 8, lines 43–63. Notwithstanding this cited assertion to be able to control lens thickness, in actual practice the compression phase of the hybrid injection-compression process of Laliberte does not mold to "hard stops". Rather, the driving force for Laliberte compression is from hydraulic cylinder 76, which urges optical insert 63 into cavity 60. This motion provides Laliberte's compression of the injected mass of molten plastic to completely fill the cavity, and the motion ends only when the resulting resistive force of the plastic exerts an equal and countervailing force onto the face of optical insert 63, such that when this resistive force of the plastic within the cavity equals the driving force of the hydraulic cylinder, then all motion ceases at this point of force equilibrium and the spacial separation of the opposing pair of optical inserts 63 and 65 will therefore determine the resulting lens thickness of the molded lens.

Any small variation in the injected mass of molten plastic, from one injection molding cycle to another, will therefore produce a corresponding increase or decrease in the lens thickness, other things being equal. As there are no mechanical hard stops in the Laliberte system, the same exact mold apparatus can thereby used to make widely differing lens thicknesses, in accordance with any variations in the injection molding process parameters and most specifically those relating to the timing sequence, and melt volume, temperature, pressure and viscosity of the injected molten plastic. In actual practice, the Laliberte process was subject to wide variations in lens thickness (one of the present invention's co-inventors managed for several years a polycarbonate Rx lens manufacturing operation which used the Laliberte process).

Another pioneering patent in this field but believed to be less commercially significant is Weber (U.S. Pat. No. 4,008, 031), which employs injection-compression molding using moveable optical inserts (dies), at least one of which is mechanically connected to a controllable hydraulic cylinder, as with Laliberte, but the process sequence differs significantly. Weber also allows the final position of the optical inserts to "float" or vary from cycle to cycle, since such relative spacing between the optical inserts will be determined by their being . . . "forced apart by injected polycarbonate, then the inserts are urged together, forcing a portion of the injected polycarbonate into a pocket" . . . (for overflow). Unlike Laliberte, therefore, variation in the mass and volume of injected molten plastic will not necessarily result in a corresponding change in lens thickness, since varying amounts of the plastic can be forced into this overflow pocket. Again, any teachings of a settable "hard stop" or other mechanically-positive means for reproducibly controlling the final molded lens thickness is absent in Weber.

Takeshita (JP61-66623, of 5.4.1986) features a different form of injection-compression lens molding, wherein its overflow pocket is able to be acted upon by a hydraulic cylinder which can be energized in proportion to the measured change of a position sensor which is reading the actual position of the compression element which advances the moveable insert against the injected plastic. When this measured position indicates a less-than-desired lens thickness, then the process controller and standalone hydraulic system of Takeshita is actuated to push forward this cylinder driver into the overflow pocket and thus create an increase in lens thickness, provided that the plastic is not yet solidified in the overflow pocket or any of the passageways in fluid communication thereof with the mold cavity contents. Again, no reliable mechanical hard stops are employed.

Of the prior art patents mentioned so far, only Laliberte is believed to have been of a lasting commercially successful method, by its assignee Gentex from its inception for approximately 10 years, until recent years, when it is believed to have been superceded by Weymouth (U.S. Pat. No. 4,933,119) also owned by Gentex and featuring as its major objective the ability to mold . . . "a plurality of articles having various masses and shapes wherein a parison mass is injected . . . (and) compression molded at predetermined pressures in accordance with their shapes or masses". In other words, the limitation of Laliberte being practical only to single cavity molding apparently is improved upon by Weymouth, offering ways to mold in a multi-cavity moldset differing lens powers and curves at the same time. However, like Laliberte, Weymouth apparently relies upon the operator's variation of injected masses and temperatures and pressures and timing sequences to produce within its mold cavity a melt being compressed by what he calls . . . "variable compression pressures . . . by similar actuators which are unequally excited" . . . so the compression stroke ends at an equilibrium point wherein the forces of the compressing apparatus are equal to those of the resisting melt pressure. Just like Laliberte, lens thickness is determined by where this compressive stroke "stalls out" against the melt's backpressure. Weymouth is silent on the subject of lens thickness control and is not believed to add to Laliberte in this regards.

In contrast to the abovementioned prior art, Applicants introduced to injection compression molding of such Rx spectacle lenses the approach of "molding to mechanical hard stops" within multi-cavity Rx spectacle lens molding in Maus (U.S. Pat. No. 4,828,769), now licensed to major competitors of Gentex, as commercial sources who make polycarbonate Rx spectacle lenses. "Molding to hard stops" is believed to have significant advantages in achieving the reproducible control of lens thickness. However, when changeover in accordance with the production schedule for from one optical power lens to a next lens in the series having differing optical power, the convex and concave inserts must correspondingly be changed in the mold cavity in order to affect this lens power change, yet must be capable of resisting estremely high compressive forces. Those employing the teachings of Maus therefore would have to adjust lens thickness by means of placing precisely dimensioned shims somewhere beneath at least one of the opposing pair of inserts, either directly below that insert or somewhere within the column of mechanical support or at the junction with the clamp plate, thereby altering the final height from the clamp plate to the face of the optically polished insert when the mold is under full compression force. In this way, once suitable shims have been placed as needed within the moldset so as to correctly produce the desired lens thickness at that particular lens power, then subsequent minor process variation in the amount of injected melt, for example, will not directly change the resulting lens thickness, since excess plastic is forced back out of the mold cavity when the full compression forces of the injection molding machine's main clamp force are applied and when the variable volume mold cavity is in the final position determined by the fixed mechanical hard stops.

Thus, a more robust process which resists changes in lens thickness from the minor cycle to cycle variations inherent in the molding process is determined. However, Maus has the disadvantage of relying upon these changeable shims being manually inserted or removed from the moldset. As previously mentioned, repolishing and lapping repairing of the optical mold inserts inevitably creates an inventory of such inserts which deviate from their original nominal thicknesses themselves. Therefore, these deviations result in corresponding deviation from the original setup and so a certain thickness of shims which worked when the inserts were originally made may no longer produce the desired lens thickness when these inserts have been repaired. Thus, an iterative process is commonly required, wherein the shims are added or removed from the moldset after some test lenses have been injection molded, measured and found to be outside of tolerance. These iterations and changes require manual addition or removal of shims by partial disassembly and removal of portions of this injection moldset by the operators.

Talbot (U.S. Pat. No. 4,184,835) employs wedge block 19 which is connected to driving force hydraulic cylinder 21, such that when this cylinder is energized, wedge block 19 is slideably displaced forward, such that its incline plane surface pushes against moveable core (mold insert) 13, thus reducing the volume of mold cavity 15 and thereby applying compressive force onto the injected molten plastic. Talbot's teachings are to energize the hydraulic cylinder and thereby drive the wedge block and correspondly move the mold insert only after . . . "a predetermined time in the molding cycle" . . . wherein freezeoff of gate 18 prevents escape of the injection molded plastic out of mold cavity 15 when these compressive forces are applied.

Bakalar (U.S. Pat. No. 4,664,854) also employs a wedge shaped slide 7 connected to a hydraulic piston 9 in order to move the wedge horizontally between a home retracted position which limits free floating outward movement of female mold 5 and an operating extended position in which the wedge engages a displaced cap member. Like Talbot, Bakalar employs this wedge shaped slide member travel on each and every cycle of the injection-compression molding process as a way of imparting compressive force onto an already filled mold cavity containing injected molten plastic.

Bakalar and Talbot lacked the inventive insight to employ the slidable wedge apparatus as a way of fast and precise adjustment to molded lens thickness, done between (not within) molding cycles. In fact, both Bakalar and Talbot are silent on the subject of how to control final molded lens thickness for varying different optical powers of such Rx spectacle lenses. Bakalar and Talbot are cited merely because they mention use of a wedged shaped member as an element in their apparatus, even though drawn to a very different purpose than Applicants' present invention.

SUMMARY OF THE INVENTION

Applicants' present invention employs a slideably mated pair of opposing wedge blocks as a part of a loadbearing support assembly which mechanically transmits forces between the back surface of the optically polished mold insert and the clamping platen of the injection molding machine, but they NEVER MOVE during the injection molding cycle itself—only after a break in production, when it is necessary to adjust the lens thickness setup. Applicants' use of such wedge blocks should not be confused with other prior art injection compression molding apparatus elements in other prior art patents cited. Specifically, two other patents (Talbot and Bakalar) are known to also have employed at least one slidable wedge block as a means of raising or lowering the position of a moveable core (mold insert) into or out of the mold cavity DURING the injection molding cycle, so as to transmit a compressive driving force onto the injected plastic.

It is an objective of Applicants' present invention to improve upon this present state of art of the cited references, by being able to mold predictable lens thicknesses by means of a variation of mechanical hard stops, and yet to do so without manual addition or removal of shims or inserts or any other part of the mold and/or without partial disassembly or removal of modular subassemblies (such as MUD-type "unit tooling", or insert/sleeve ringsets) of this injection moldset by the operators. Applicants' present invention comprises moveable adjustment means mounted externally onto the moldset at a location easily accessible to an operator for a manually-driven motion to one of a plurality of positions, by which motions a specified amount of linear displacement of one wedge block is produced by means of a mechanical linkage between the moveable adjustment means and the wedge blocky thus quickly yet precisely adjusting for molded lens thickness without removing the injection moldset from the clamping platens of the injection molding machine, nor disassembling this injection moldset. The present invention can thereby use several different inserts of the same nominal optically curved faces but with differing insert thicknesses, to assemble into a multicavity mold without using shims, yet produce all these lenses of the same nominal thicknesses (within + or −0.1 mm tolerances). Also importantly, since these lens molds operate at very hot temperatures (typically 250–285 F.), these moveable adjustment means are mounted externally onto the moldset with sufficient thermal isolation that the operator can safely make these manual adjustment motions while the mold is maintained at its desired operating temperature, without danger of being burned. The prior art adjustments require operators to wait for mold cooling down, then changing out those parts of the mold (i.e. shims and/or inserts), and warming back up, thereby causing major downtime.

In the prior art (see FIG. 5), shims must be added or removed every time lens thickness needs adjustment, but that is not needed in the present invention. Every time inserts are handled increases the probability of damaging the optically polished face. Thus, reduced insert damage is another benefit of the present invention.

The present invention apparatus comprises:

a. the injection mold having at least one mold cavity formed between two moldhalves which open and close about a parting line, with each moldhalf housing at least one of an opposing pair of curved optically polished mold inserts surface facing into the mold cavity and each of the inserts having a substantially planar back surface which faces away from the mold cavity, the inserts' optically polished surface facing into the mold cavity being of specified surface curvatures and the opposing pair of mold inserts thereby forming partforming surfaces of said mold cavity, and the inserts' back surface being mechanically supported against a substantially mating planar face of a loadbearing support assembly which in turn is capable of transmitting mechanical forces from the inserts within each moldhalf to the corresponding clamping platen of the injection molding machine, such that any melt pressures which may be exerted upon these partforming surfaces of the mold cavity after being filled by injection are ultimately supported by a countervailing clamping force applied by the injection molding machine;

b. a slideably mated pair of opposing wedge blocks, each wedge having a specified inclined plane geometry such that a specified amount of linear displacement of one wedge block causes a correspondingly predetermined linear displacement of the opposing wedge block in a direction perpendicular to the parting line plane, the specified inclined plane geometry being chosen of a sufficiently low angle so as to prevent slippage between the opposing wedges during injection molding cycles, with the slideably mated pair of opposing wedge blocks comprising the loadbearing support assembly which mechanically transmits forces between the inserts' back surface and the clamping platen of the injection molding machine;

c. means for adjustment external to the injection mold and accessible to an operator for manual motion without danger of being burned, with these means for adjustment being capable of being moved manually by the operator to a plurality of positions when the mold is not filled with plastic;

d. means for mechanical linkage of motions of the slideably mated pair of opposing wedge blocks in response to an operator's manually-driven motions of the means for adjustment external to the injection mold, by which operator's manual motions is produced a specified amount of linear displacement of one wedge block;

such that the correspondingly predetermined linear displacement in a perpendicular direction of the opposing wedge block advances or retracts the insert's optically polished surface facing into the mold cavity with respect to the parting line plane in at least one of the two moldhalves, thereby increasing or decreasing thickness of the resulting injection molded thermoplastic vision-corrective spectacle lens, without wedge slippage during injection molding cycles.

Using the present invention's injection mold apparatus just described for an improved method for adjustment of thickness of the injection molded thermoplastic vision-corrective spectacle lens, the method comprises the steps of:

a. moving these external means for adjustment to make a corresponding specified amount of linear displacement of one wedge block by a mechanical linkage therebetween, the wedge block being one of a slideably mated pair of opposing wedge blocks, each wedge having a specified inclined plane geometry such that a specified amount of linear displacement of one wedge block causes a correspondingly predetermined linear displacement of the opposing wedge block in a direction perpendicular to the parting line plane, with the slideably mated pair of opposing wedge blocks comprising the loadbearing support assembly, such that the corresponding specified linear displacement in a perpendicular direction of the opposing wedge block advances or retracts the insert optically polished surface facing into the mold cavity in at least one of the two moldhalves, thereby increasing or decreasing thickness of the injection molded thermoplastic vision-corrective spectacle lens;

b. running at least one full cycle of the injection mold in the injection molding machine, thereby molding at least one of the lens c. measuring thickness of the lens and comparing the measured thickness to a predetermined desired thickness for the lens.

A preferred method has the added step of moving the means for adjustment, in order to make a corresponding adjustment to advance or retract the insert, running at least another full cycle of said injection mold, and measuring thickness of the lens and comparing the measured thickness to a predetermined desired thickness for the lens, and doing such iterations until the measured thickness and the predetermined desired thickness for the lens are within a predetermined tolerance of each other.

A further preferred method has the added step of measuring a setback distance by suitable guage means, the setback distance being measured from the parting line to at least one of the curved optically polished mold inserts surface facing into the mold cavity, and making an initial adjustment wherein a safety factor is added to this measured setback distance to assure there can be no contact between the pair of opposing curved optically polished mold inserts surface facing into the mold cavity;

then running at least one full cycle of the injection mold in the injection molding machine, thereby molding at least one of the lens then measuring thickness of the lens and comparing the measured thickness to a predetermined desired thickness for the lens.

DETAILED DESCRIPTION OF THE INVENTION

Figure 1:
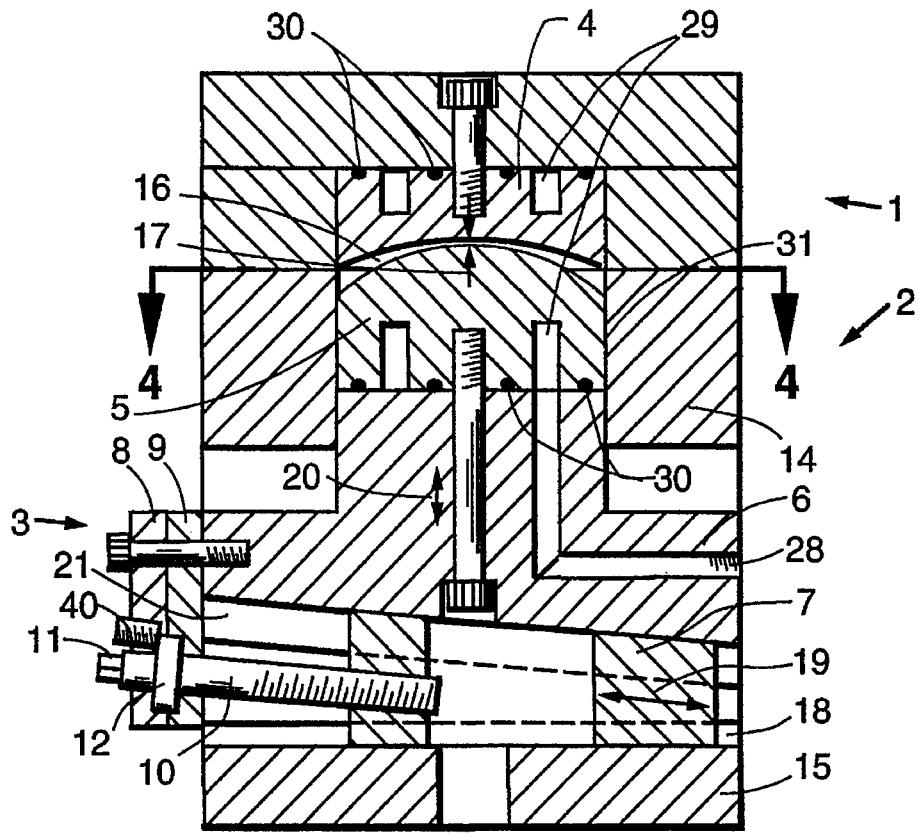
FIG. 1 shows a cross-sectional view, (1—1) as depicted in FIG. 4, of one lens mold cavity within a 2-cavity moldset of the present invention, with this one cavity being set up to produce a thinner FSV high-minus-powered lens.
Figure 2:
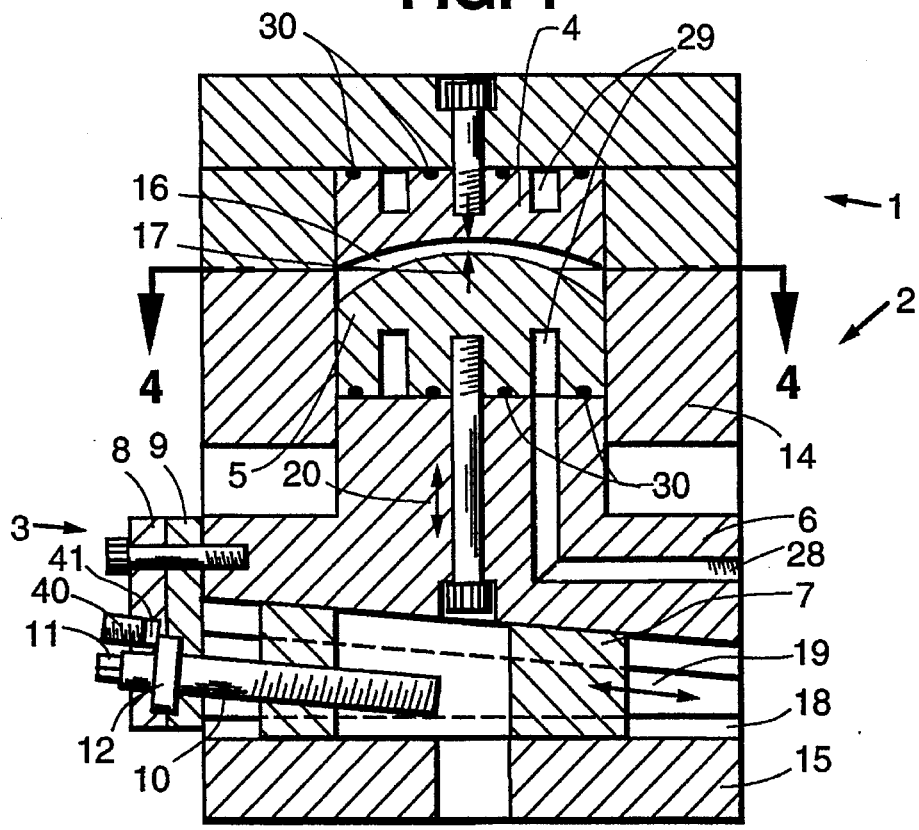
FIG. 2 shows a cross-sectional view, (2—2) as depicted in FIG. 4, of the other lens mold cavity within the same 2-cavity moldset of the present invention, with this other cavity being set up to produce a thicker FSV high-minus-powered lens.
Figure 4:
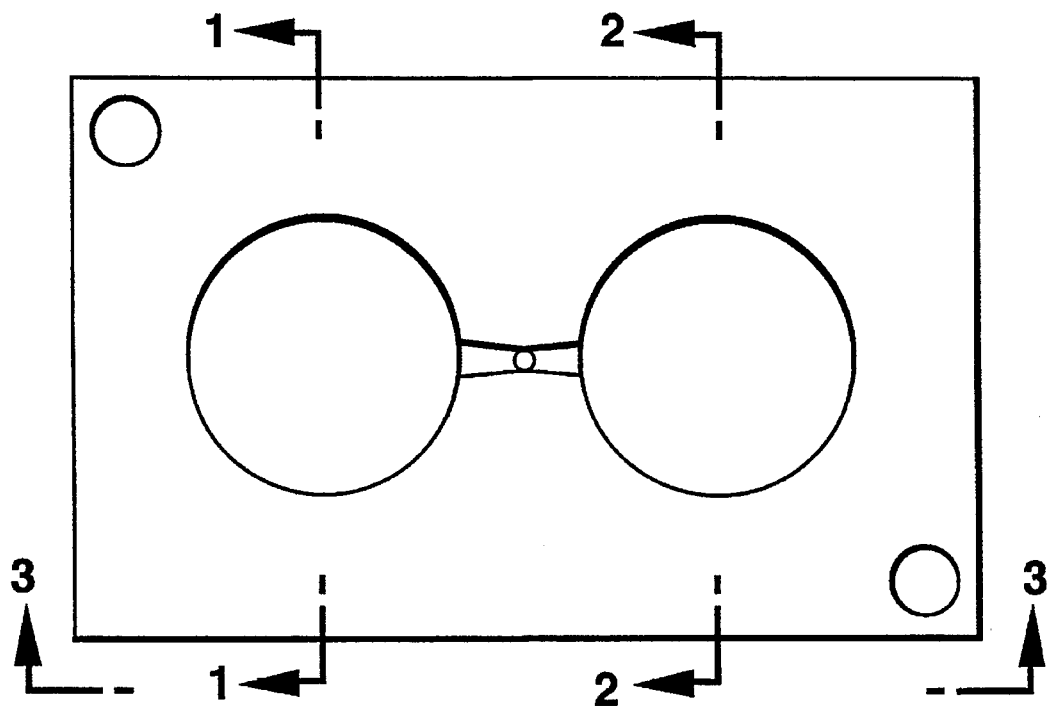
FIG. 4 shows an internal plan view. (4—4) as depicted in FIG. 2, as seen from the parting line plane of the same 2-cavity moldset of the present invention, showing how the other views are taken, and how injected plastic will flow from the sprue located at the central axis into each of the edge-gated mold cavities wherein the opposing paired inserts are housed.

FIG. 1 shows cross-sectional view (1—1) of one mold cavity within a simplified 2-cavity injection moldset (see FIG. 4 for a plan view (4—4) as seen from the parting line plane of the same 2-cavity moldset) of the present invention, with this one cavity being set up to produce a thinner FSV high-minus-powered lens. Now see FIG. 2, showing a cross-sectional view (2—2) of the other lens mold cavity within the same 2-cavity moldset of the present invention, with this other cavity being set up to produce a thicker FSV high-minus-powered lens.

Figure 3:
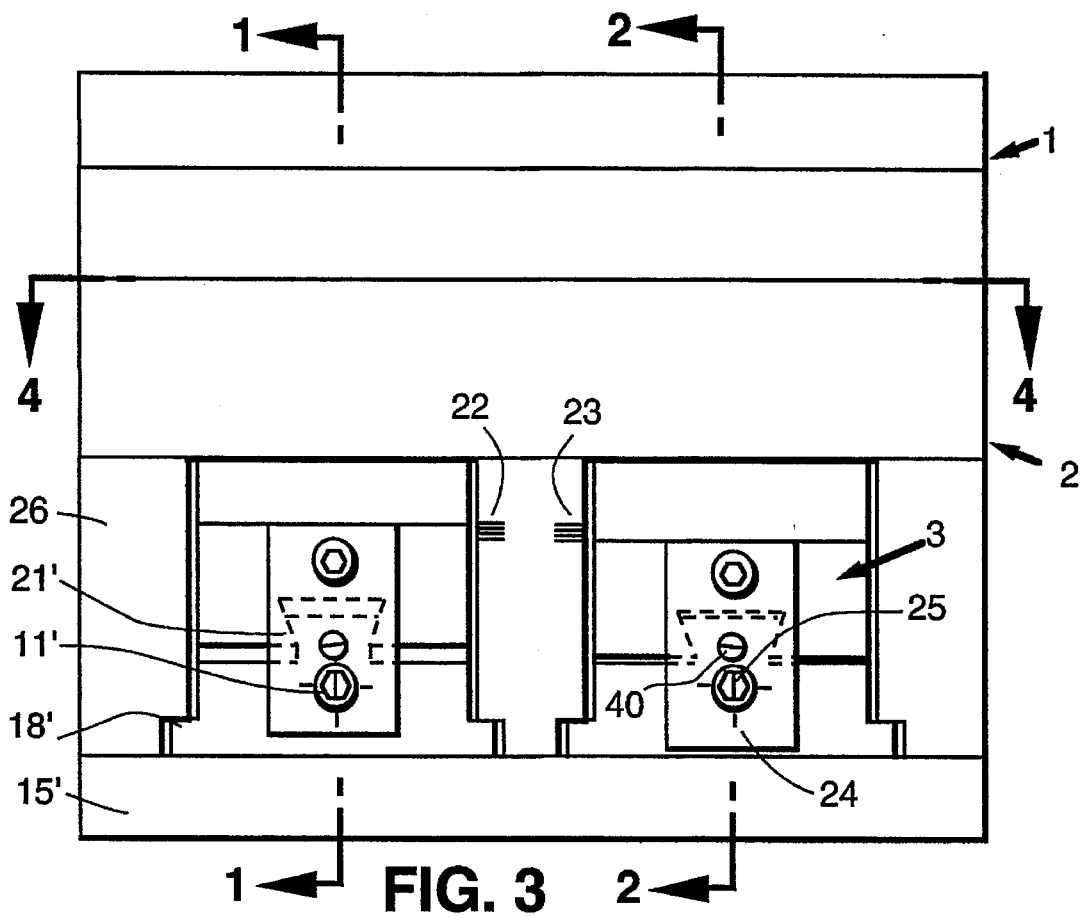
FIG. 3 shows an external side view, (3—3) as depicted in FIG. 4, of the same 2-cavity moldset of the present invention, showing how the moveable adjustment means are mounted so as to be easily accessible to an operator for a manual motion to one of a plurality of positions, with sufficient thermal isolation that the operator can safely make these manual adjustment motions while the mold is maintained at its desired operating temperature, without danger of being burned. Note that the lefthand cavity (shown in FIG. 1 being set up to produce a thinner FSV high-minus-powered lens) is showing the opposing wedge blocks in a more advanced-forward position, compared to the righthand cavity (shown in FIG. 2 being set up to produce a thicker FSV high-minus-powered lens) which is showing the opposing wedge blocks in a more retracted-back position.

The injection mold has two mold halves (1) and (2), which open and close on the plane of a parting line (4—4). Each mold half houses at least one of an opposing pair of curved, optically-polished mold inserts (4) and (5), and each insert is mounted with its optically-polished surface facing into the mold cavity (16). Conventionally, upon the B-side mold half (2), which is mounted onto the movable platen (not shown) of the injection-molding machine (not shown), a convex-curve-surfaced insert (5) is employed, and upon the A-side of the mold half (1), which is mounted onto the stationary platen (not shown) of the injection molding machine (not shown), is mounted a concave-curved, optically-polished-surface insert (4). The present invention is shown in FIGS. 1, 2, and 3 on the B-side mold half (2) but is not so limited; it can be used in either mold half.

Note that each of this opposing pair of mold inserts has back surfaces which are substantially flat, or planar, facing away from the mold cavity, and, to prevent undesirable optical prism in the resulting molded lens, this opposing pair of inserts must be co-axially aligned for good concentricity and must be firmly mounted and held against sufficiently rigid support plates or pillars (6) of the moldset, so as to prevent cocking or wedging with respect to the optical axis of the molded lens. This requires that the insert be well supported, with substantially no degrees of free motion other than perhaps a slideable fit for traversing forward or back within the concentric bore (31) which surrounds the insert (5). as shown, around its O.D. perimeter.

An optional but preferred element in the injection-molded apparatus assembly would be provisions for circulating a heat-transfer fluid within the mold insert. By firmly mounting the back surface of mold insert against the support plate or pillar, as shown, this desirable thermodynamic feature can be built in by drilling water lines (28) into this support pillar and aligning these with the respective inlet and outlet holes on the insert's back, thereby providing for flow within a suitable pattern of cooling channels (29) machined within the insert. To prevent water leaks, suitably-dimensioned O-ring (30) grooves are cut into either the front surface of the support pillar or the back surface of the insert, such that when the back surface is tightly drawn against the pillar front surface, the O-ring within the groove is suitably compressed to provide a positive seal, thus preventing water leaks.

Applicants' U.S. Pat. No. 4,793,953, incorporated herein by reference, teaches an especially preferred way of improving heat-transfer rates in such optical thermoplastic injection molding by employing chrome or nickel electroplated films which are then abrasively polished into optical surfaces onto a monolithic beryllium-copper mold insert construction, wherein the monolithic insert also contains such channels for circulating heat-transfer fluids. A special case for improved thermodynamics in precision-replicated optical injection molding of thermoplastics, which also employs high thermal conductivity BeCu optical mold inserts, is taught in Applicants' U.S. Pat. No. 5,376,317, also incorporated herein by reference.

Looking now upon the support pillar (6), it offers a substantially-planar front surface against which the back surface of the mold insert is firmly mounted, typically by hold-down bolt drawn tightly, as shown. The support pillar shown here could alternatively have other geometries or shapes such as a rectangular mold plate, but most commonly, would be a cylindrically-shaped piece with a round, flat forward end and (seen in plan view) an end with sidewall which optionally may have a slideable fit within a concentrically-enclosing bushing or sleeve or bore (31) of a mold plate (14) element of the mold half. As an especially preferred embodiment, the back surface of this support pillar is shown being also the top wedge of a pair of wedge blocks. A less preferred configuration (not shown) of the present invention would make both the top and bottom sides of the support pillar to be flat planar surfaces, then bolt this flat bottom pillar against a mating flat top surface of the top wedge blockof the mating opposing pair of wedge blocks.

See FIG. 3. In either embodiment, the bottom surface or back surface of lower wedge block (7) is slideably held against support clamp plate (15') by profile-cut slot (18'). This opposing pair of wedge blocks is firmly seated and housed in the injection moldset so as to provide an unbroken chain of high loadbearing capability, such that when high packing forces by the injected molten plastic are exerted upon the optically-polished, part-forming surfaces of the mold cavity, these forces are transmitted back through the mold insert, through its support pillar back through the opposing pair of wedge blocks, and ultimately supported by the injection moldset, which in turn is supported by a countervailing clamping force applied by the injection molding machine. In this way, high injection melt pressures can be exerted within the mold cavity without significantly shifting the relative concentric axial positions of the opposing mold inserts, so as not to permit any axial-tilt deviations or "wedging" or "cocking" problems.

Turning now to the slideably-mated pair of opposing wedge blocks (6) and (7), note that each has a certain specified inclined-plane geometry so that, for any specified amount of linear displacement (19) of one wedge block (7) back or forth in a track whose base lies in a plane parallel to the parting line plane (4—4), a corresponding predetermined specified linear displacement (20) of the opposing wedge block (6) is caused to retract back (away from the parting line 4—4) or advance forward (toward the parting line 4—4) in a substantially perpendicular direction to the parting line plane 4—4. This geometric relationship between the opposing wedge blocks could conceivably encompass a very wide range of possible trigonometric angles, but the angle of inclination for the rear wedge block (7) with respect to the track whose base lies in a plane parallel to the parting line plane (4—4) must be designed to be relatively low (less than 45 degrees, which would give a 1:1 ratio of horizontal-to-vertical displacements of the mating wedges (6) and (7). Preferably, a much lower (less than 20 degrees) angle will be selected.

Most preferably, this selected angle will be between 5 and 15 degrees. This lowest angle is chosen so that the "stiction forces" (frictional drag) between the 2 wedge blocks when compressively pressed together is sufficiently high so that melt pressures exerted upon the partforming surfaces of the mold cavity's inserts (after being filled by injection) do not cause substantial slippage between the 2 opposing wedge blocks. By not permitting substantial slippage to occur, these forces from the plastic onto the inserts are transmitted back through a substantially mating planar face of a loadbearing support assembly (comprising these 2 opposing wedge blocks) which in turn is capable of transmitting these mechanical forces to the corresponding clamping platen of the injection molding machine, wherein a countervailing force is applied. The specified inclined plane geometry must be chosen of a sufficiently low angle so as to prevent slippage between the opposing wedges during injection molding cycles. Exact "lock-up angle" which prevents any relative motion between these wedges while normal production molding cycles are going on will depend on factors affecting frictional drag between the paired wedges (such as surface roughness RMS on the mating surface, or presence of any lubricating substance).

A second reason to prefer a lower angle is that it takes a relatively larger linear displacement of this rear wedge block (7) to create a relatively smaller forward or backward motion of the front wedge block (6), thus improving accuracy in adjustment measurements. For example, if the angular relationship of the linear displacement of the rear wedge block was 1:1 with the substantially-perpendicular forward displacement of the front wedge block, any error in the linear motion of the rear block produces a corresponding 1:1 error in the position of the forward wedge block. If this ratio was increased further to a 2:1 ratio, then any setting error in the back wedge block produces twice as large an error in the forward position. Obviously, this is undesirable. Therefore, in a preferred embodiment, the geometric ratio between the blocks will be less than 1:1, and most preferably, at least 5:1.

FIG. 3 shows an external side view (3—3) of the same 2-cavity moldset of the present invention, showing how the moveable adjustment means are mounted so as to be easily accessible to an operator for a manually-driven motion to one of a plurality of positions, with sufficient thermal isolation that the operator can safely make these manual adjustment motions while the mold is maintained at its desired operating temperature, without danger of being burned. Note that the lefthand cavity (shown in FIG. 1 being set up to produce a thinner FSV high-minus-powered lens) is showing the opposing wedge blocks in a more advanced-forward position, compared to the righthand cavity (shown in FIG. 2 being set up to produce a thicker FSV high-minus-powered lens) which is showing the opposing wedge blocks in a more retracted-backward position. Also note that the 2 wedge blocks are mated together in a "dovetail" interlocking sliding fit (21'), and the rear wedge block is slideably fit to profile-cut slot (18'), to reduce unwanted up-and-down displacements during their axial motions.

The present invention's means for adjusting lens thickness converts a linear displacement (19) taking place in a plane substantially parallel to the parting line plane into a corresponding displacement (20) or change in position in an axial direction which is substantially perpendicular to the parting-line plane. The driving force for this change in position is the operator (not shown). By manually applying a torque rotational force onto a rotatable head (11) joined onto a threaded screw (10) having enlarged shoulder (12) suspended within counterbored plates (8) and (9), the threaded screw (10) turns in the direction of the torque rotational force. Since the threaded screw (10) connects with a mating threaded bore within the rear wedge block, if the threaded screw is rotated in a first direction, the rear wedge block is displaced to the left (in FIG. 1 or 2) and, correspondingly, the front wedge block is displaced forward conversely, if the threaded screw is rotated in the opposite second direction, the rear wedge block is displaced to the right (in FIG. 1 or 2) and, correspondingly, the front wedge block is displaced rearward. For example, one possible convention could be to setup the lens-thickness-adjusting mechanism so as to convert a clockwise rotation into a more forward position of the mold insert, thus producing a thinner lens, and conversely, a counterclockwise rotation producing a rearward change in position of the mold insert, thus producing a thicker lens.

In a preferred embodiment shown in FIG. 3, bolted onto one of the outer side surfaces of the operator side of the injection moldset, so as to be easily accessible to the operator for the required manual adjustments during the setup phase of use, is the means for adjustment, as shown. Note that it is showing a rotatable head (11). This rotatable head could be a socket-head bolt which can be turned with an Allen wrench or by a crank handle which suitably mates into it. The mechanical ratio of rotation relative to insert motion between first and second positions is high, for reasons mentioned earlier. In an actual working lensmold example which uses the present invention (which we nicknamed "Dial Adjust"), it takes one full 360-degree rotation of the rotatable head to produce just 0.20 mm change in position of the mold insert, and correspondingly a 0.20 mm change in lens thickness. Just one "quarter-turn" (90-degree) rotation of the rotatable head will produce just 0.05 mm change in position of the mold insert, and correspondingly a 0.05 mm (or 50 micron) change in lens thickness.

Note also that, optionally, after suitable adjustment has been made, if the resistance to slippage between the mating wedges during normal production molding cycles needs to be made even more positive than by the "lock-up angle" alone, any means which resists rotation of the threaded screw will do the job. It could be as simple as drilling and tapping through plates (8) or (9) at an angle perpendicular to the axis of the threaded screw and intersecting with same, inserting a locking set screw (40), and by tightening it down. The relative positions of the wedges remains frozen until the next time production is stopped and thickness adjustmant needs to be made again, at which time the locking set screw is first turned to loosen before rotating the adjustment head. Other locking means for preventing slippage between the wedges can include placing a fitted bar across the adjustable head and clamping it in place, as another way of preventing rotation of the threaded screw.

Also, in FIG. 3, note that a Vernier scale ((22) and (23)) can be engraved onto the moldset and that partial rotation can be measured and recorded "before" and "after" in 90 degree increments (by noting alignment of the slot in rotatable head (11) with respect to 90 degree marks (24) made in the stationary mounting pad). In this way, a high-resolution readout of the relative displacement change can be readily seen and marked down by the operator while he is adjusting it, by counting the number of full rotations (360 degrees each)+the number of quarter turns (additional 90 degrees), for recording into a data log, charting each of the settings made at each of these molding setups with a log of the corresponding actual lens thickness, for good record-keeping.

Alternative means for mechanical linkage of the motions of the mold insert and its support members while housed within the injection moldset can be envisioned, even though the combination of a threaded screw operatively connected to a low-angulation mated opposing pair wedge blocks is believed to be preferred. Less preferred but somewhat functional equivalents of it could include use of a rotatable camshaft crank with at least one eccentric cam (not shown) which could drive, alternatively forward or back, the support pillar and the mating mold insert. In such an embodiment, a crank handle would be a preferred means for adjustment, with the crank handle being external to the injection mold and accessible to an operator for manual motion. A sufficiently large crank handle provides mechanical leverage, which would be desirable in the event of having to drive forward or back these support elements. However, it is believed that the eccentric cam is inherently inferior means for raising and lowering the insert with respect to the parting line (and thereby adjusting lens thickness) because it would provide less loadbearing and more back-slippage when the plastic is pushing onto the insert face.

Currently, the thermoplastic of choice is optical-grade polycarbonate resin of medium-high melt viscosity (Melt Flow Index of 6–10 range MFI), but alternative thermoplastics for the future may employ certain amorphous polyolefins which offer desirable balance of high refractive index with high Abbe number, for even better optical clarity and reduced chromatic aberration, while still giving the high-light-bending power of high index of refraction.

Although the present invention can be advantageously used with certain forms of injection-compression molding processes, it can also be used with the more well-known coining processes and with straight injection just as well. But because the highest degree of difficulty in molding optical lenses is to mold high-minus-powered spectacle lenses which are desirably as thin and light as possible, (wherein the high-minus-powered lens inherently must have a very thin center thickness—desirably 1.0—1.5 μm—and yet, typically a very high edge thickness—10 mm or greater—this special case is worth attention. It is well known to those skilled in the art that some form of injection-compression molding process sequence which utilizes a pre-enlarged, variable-volume mold cavity construction is required in order to minimize knit lines during filling with these high-minus-power lens geometries. Thus, on each such injection-compression molding cycles, the lens mold cavity is sufficiently oversized at the start of each injection cycle so as to present a variable-volume cavity with sufficiently great cavity height that the meltflow path would be relatively nonconstrictive, compared to a conventional injection mold during the filling operation.

Examples of such suitable injection-compression molds, having variable-volume mold cavity construction, include the cited prior art references of Laliberte and Weymouth, as well as Applicants' U.S. Pat. No. 4,828,769 and U.S. Pat. No. 4,900,242, both incorporated herein by reference. In each of these variable-volume mold cavity constructions using an injection-compression process sequence, the compression stroke is applied to the injected melt by creating a relative motion between a part-forming mold insert having an optically-polished face of precise curvature with respect to the parting-line reference plane. This is typically accomplished by a forward motion of the mold insert axially within the concentric bore of the surrounding moldset, wherein the insert has a slideable fit. Various driving forces for this compression stroke can be seen in these cited prior-art patents, ranging from hydraulic cylinders mounted within the moldset to employing the main clamping force of the injection molding machine, in conjunction with floating mold plate elements, which are spring-loaded. These, and other prior-art patents cited earlier, may vary upon the way in which the final lens thickness is determined. As described earlier, some "mold to hard stops" (including Applicants' cited patents), and others end their compression stroke when the resistive forces of the melt equal the compressive driving force, at which point no further motion stroke results and the final lens thickness is thereby determined. In each of these prior-art references, the changeable position of the mold insert with respect to the parting line is simply to provide the injection-compression stroke as an improved way of forming the resulting molded spectacle lens. All these references are silent retarding any way of settably adjusting final lens thickness without disassembly of the moldset.

Figure 5:
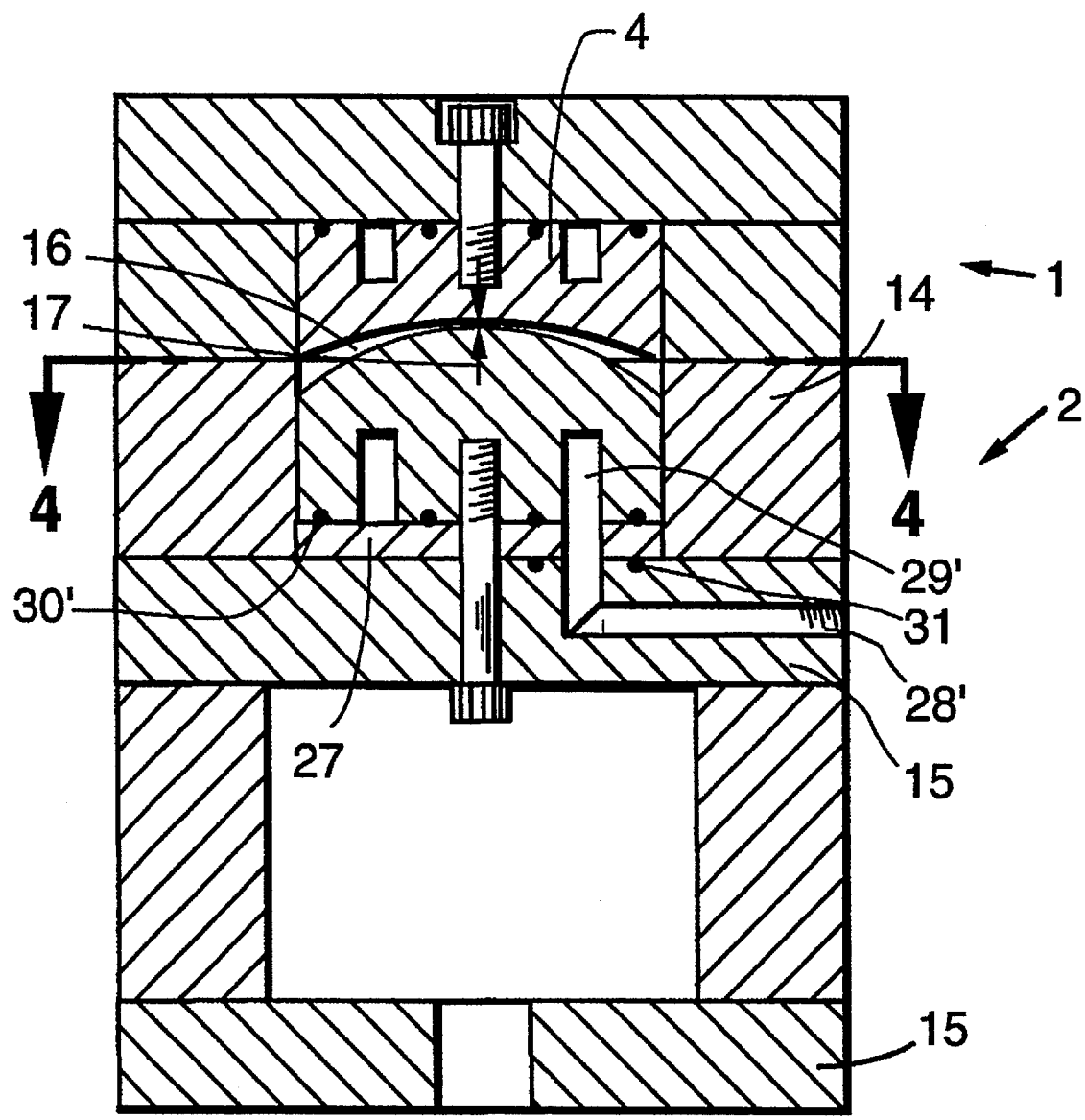
FIG. 5 shows a cross-sectional view of a prior art lens mold cavity.

See FIG. 5, labeled "Comparative Example". Shown in cross-sectional view is a mold cavity wherein the final lens thickness is settably adjusted by use of one or more shims (27). With no shim in the moldset, this mold cavity will have the optically-polished surface of the mold insert at its maximum separation distance from the parting-line reference plane (4—4), to thereby reach its maximum final part thickness (17). To reduce this final part thickness of the molded lens requires adding shims in the position shown—successively thicker shims give correspondingly thinner lens. However, access to such change in shims inherently involves significant disassembly of the mold, which in turn requires waiting a long time, since, in operation, these thermoplastic injection molds run very hot temperatures (typically, within 10–30 degress C. of the glass-tansition temperature of the amorphous thermoplastic optical-grade resin). The operator must, therefore, wait until the moldset is sufficiently cooled so as to allow manual disassembly without burning one's hands. Once the disassembly has been made and the correct shim has been placed and reassembled, then a significantly-long time must again be waited until the moldset is sufficiently heated back again, so as to make good quality lenses. Another limitation of the prior art as shown in FIG. 5, "Comparative Example", is that it is much more difficult to avoid water leaks from around the O rings (30') and (31), since there are twice as many needed in this FIG. 5 design vs. the present invention shown in FIG. 1 and 2. Furthermore, the shim may not perfectly mate with the planar surfaces of the insert's back and the support's face, if both sides of the shim are not both flat and parallel, thus causing leaks. Each time a different lens power needs to be run in the production schedule, the inserts must be removed and a new set installed, thus requiring a new set of shims Each such changeover assumes a perfect mating at each of the 2 more O rings, or else the highly-pressurized water (circulating at 250–285 F. temperature) will find any tiny leaks and force a shutdown to re-assemble, iteratively, until finally all cavities in the multi-cavity lens mold is running leak-free. Substituting oil instead of pressurized water reduces the line pressures which forces fluid through tiny leaks, but at these temperatures oil is extremely low viscosity, and it will migrate from any tiny leaks up onto the optically-polished part-forming surfaces of the inserts, thus causing rejectable surface blemishes onto the molded lens; thus, oil is worse than water even tough its leak volume might be far smaller, because this pressurized water quickly is converted to steam and evaporates away, unless the leak is larger. For these reasons, most known prior art injection-compression Rx FSV lens molds are now running with no circulating heat transfer whatsoever within the inserts, even though the molding cycle times are greatly lengthened thereby, and total output is lowered accordingly, without circulating a heat transfer fluid within the insert near the surfaces wetted by the plastic melt.

We claim:

1. An injection mold apparatus for molding thermoplastic vision-corrective spectacle lens, said injection mold having a mechanism determining a preset fixed thickness of said lens by precisely adjusting and then locking into a fixed position said mechanism without removing said injection mold mounted onto a clamping platen of an injection molding machine nor disassembling said injection mold, the apparatus comprising:

a. said injection mold having at least one mold cavity formed between two moldhalves which open and close about a parting line, with each moldhalf housing at least one of an opposing pair of curved optically polished mold inserts, each having a surface facing into said mold cavity and each of said inserts having a substantially planar back surface which faces away from said mold cavity, said insert optically polished surface facing into said mold cavity being of specified surface curvatures and said opposing pair of mold inserts thereby forming partforming surfaces of said mold cavity, said insert back surface being mechanically supported against a substantially mating planar face of a load-bearing support assembly which in turn is capable of transmitting mechanical forces from said insert within said moldhalf to said clamping platen of said injection molding machine, such that melt pressures which may be exerted upon said partforming surfaces of said mold cavity after being filled by injection are ultimately supported by a countervailing clamping force applied by said injection molding machine;

b. an adjustable and lockable mated pair of opposing wedge blocks, each wedge having a specified inclined plane geometry such that a specified amount of linear displacement of one wedge block causes a correspondingly predetermined specified linear displacement of the opposing wedge block in a direction perpendicular to the parting line plane, said mated pair of opposing wedge blocks comprising said loadbearing support assembly which mechanically transmits forces between said inserts back surface and said clamping platen of said injection molding machine;

c. means for adjustment for determining said preset fixed thickness of said lens external to said injection mold, said means for adjustment being capable of being moved to a plurality of positions when the mold is not filled with plastic;

d. means for mechanical linkage of motions of said mated pair of opposing wedge blocks in response to operator manually-driven motions of said means for adjustment external to said injection mold, by which motions a specified amount of linear displacement of one wedge block is produced when the mold is not filled with plastic;

e. means for locking said mated pair of opposing wedge blocks into a fixed position after said adjustment is made when the mold is not filled with plastic;

such that there is substantially no slippage between said mated pair of opposing wedges during subsequent injection molding cycles, thereby determining a preset fixed thickness of said lens.

2. An apparatus of claim 1 wherein said means for locking said mated pair of opposing wedge blocks into a fixed position prevents rotation of a threaded screw, said threaded screw being said means for mechanical linkage.

3. An apparatus of claim 1 wherein a geometric relationship between said opposing wedge blocks has an angle of inclination of less than 20 degrees.

4. An apparatus of claim 1 wherein said means for locking said mated pair of opposing wedge blocks into a fixed position is a set screw.

5. An apparatus of claim 1 wherein a suitable pattern of cooling channels are machined within said inserts so as to provide for internal circulation of a heat-transfer fluid within said insert being maintained in fluid communication with supply lines into said loadbearing support assembly.

6. An apparatus of claim 5 wherein said inserts are made of a high thermal conductivity metal such as beryllium copper and having nickel or chromium plating on said optically polished surface of said insert.

7. An apparatus of claim 1 wherein said injection mold has at least one pre-enlarged, variable-volume mold cavity oversized at the start of each injection cycle with sufficiently great cavity height that a meltflow path would be relatively nonconstrictive, and a compression stroke is applied to injected melt by creating a relative motion between said insert with respect to the parting-line reference plane, by sliding forward motion of said insert axially within a concentric bore of said mold, said mold thus being capable of an injection-compression molding process on said pre-enlarged, variable-volume mold cavity, in order to minimize knit lines during filling high-minus-power lens geometries.

8. An apparatus of claim 1 wherein the means for mechanical linkage of motions of said slideably mated pair of opposing wedge blocks and a means for adjustment external to said injection mold and accessible to an operator for manual motion is a rotatable threaded screw of known pitch fitted with an external head accessible to an operator.

9. An apparatus of claim 8 wherein the means for mechanical linkage of motions of said slideably mated pair of opposing wedge blocks and a means for adjustment external to said injection mold and accessible to an operator for manual motion employs different marked or numbered position settings, so as to be able to be recorded or quantified for reproducible settings at any future time.

10. An apparatus of claim 8 wherein the means for mechanical linkage of motions of said slideably mated pair of opposing wedge blocks and a means for adjustment external to said injection mold is a rotatable threaded screw of a fine pitch requiring a full 360 degree rotation in order to advance forward said insert 0.2 mm, thereby reducing lens thickness by 0.2 mm.

11. An apparatus of claim 8 with means for measuring a setback distance by vernier gage or dial indicator, said setback distance being measured from said parting line to at least one of said curved optically polished mold inserts surface facing into said mold cavity.

12. An injection mold apparatus for molding thermoplastic vision-corrective spectacle lens, said injection mold having a mechanism determining a preset fixed thickness of said lens being of a finished single vision family of differing optical magnification powers by precisely adjusting and then locking into a fixed position said mechanism without removing said injection mold mounted onto a clamping platen of an injection molding machine nor disassembling said injection mold, the apparatus comprising:

a. said injection mold having a plurality of mold cavities formed between two moldhalves which open and close about a parting line, with each moldhalf housing a plurality of opposing pairs of curved optically polished mold inserts, each of said inserts having a curved optically polished surface facing into said mold cavity and each of said inserts having a substantially planar back surface which faces away from said mold cavity, said insert optically polished surface facing into said mold cavity being of specified surface curvatures and said opposing pair of mold inserts thereby forming partforming surfaces of said mold cavity, said insert back surface being mechanically supported against a substantially mating planar face of a loadbearing support assembly which in turn is capable of transmitting mechanical forces from said insert within said moldhalf to said clamping platen of said injection molding machine, such that melt pressures which may be exerted upon said partforming surfaces of said mold cavity after being filled by injection are ultimately supported by a countervailing clamping force applied by said injection molding machine, said inserts having a suitable pattern of cooling channels machined within said inserts so as to provide for internal circulation of a heat-transfer fluid within said insert being maintained in fluid communication with supply lines into said loadbearing support assembly, said inserts being made of a high thermal conductivity metal such as beryllium copper and having nickel or chromium plating onto said optically polished surface of said inserts;

said mold having a plurality of pre-enlarged, variable-volume mold cavities oversized at the start of each injection cycle with sufficiently great cavity height that the meltflow path would be relatively nonconstrictive, and the compression stroke is applied to injected melt by creating a relative motion between said inserts with respect to the parting-line reference plane, by sliding forward motion of said inserts axially within concentric bores of said mold, b. an adjustable and lockable mated pair of opposing wedge blocks, each wedge having a specified inclined plane geometry such that a specified amount of linear displacement of one wedge block causes a correspondingly predetermined specified linear displacement of the opposing wedge block in a direction perpendicular to the parting line plane,
said mated pair of opposing wedge blocks comprising said loadbearing support assembly which mechanically transmits forces between said inserts back surface and said clamping platen of said injection molding machine, said opposing wedge blocks having an angle of inclination of between 5 and 15 degrees;

c. means for adjustment for determining said preset fixed thickness of said lens external to said injection mold, said means for adjustment being capable of being moved to a plurality of positions when the mold is not filled with plastic;

d. means for mechanical linkage of motions of said mated pair of opposing wedge blocks in response to operator manually-driven motions of said means for adjustment external to said injection mold, by which motions a specified amount of linear displacement of one wedge block is produced when the mold is not filled with plastic, said means for mechanical linkage of motions of said mated pair of opposing wedge blocks and a means for adjustment being a rotatable threaded screw of known pitch fitted with an external head;

e. means for locking said mated pair of opposing wedge blocks into a fixed position after said ajustment is made when the mold is not filled with plastic;
such that there is substantially no slippage between said mated pair of opposing wedges during subsequent injection molding cycles, thereby determining a preset fixed thickness of said lens.

13. A method for adjustment of thickness of an injection molded thermoplastic vision-corrective spectacle lens being of a finished single vision family of differing optical magnification powers without removing an injection mold mounted onto a clamping platen of an injection molding machine nor disassembling said injection mold, the method being employed as part of setup procedures before start of injection, the method comprising:

a. moving a means for adjustment external to said injection mold and accessible to an operator for manually driven motion to one of a plurality of positions, before starting injection molding cycles;

b. sliding a wedge block mechanically linked to said means for adjustment,
said wedge block being one of a slideably mated pair of opposing wedge blocks, each wedge having a specified inclined plane geometry such that a specified amount of linear displacement of one wedge block causes a correspondingly predetermined linear displacement of the opposing wedge block in a direction perpendicular to the parting line plane;

c. locking in place said slideably mated pair of opposing wedge blocks so as to prevent slippage between said slideably mated pair of opposing wedges during injection molding cycles, said slideably mated pair of opposing wedge blocks comprising a loadbearing support assembly which mechanically transmits compressive forces between a substantially planar back surface of said insert and said platen of said injection molding machine,
said insert and said loadbearing support assembly being mounted within one of two moldhalves which open and close about a parting line to form at least one mold cavity, said insert being one of an opposing pair of curved optically polished mold inserts surface facing into said mold cavity
such that said correspondingly predetermined linear displacement of the opposing wedge block in a direction perpendicular to the parting line plane advances or retracts said insert optically polished surface facing into said mold cavity in at least one of said two moldhalves, thereby increasing or decreasing thickness of said injection molded thermoplastic vision-corrective spectacle lens.

14. A method of claim 13 with additional steps of:

d. measuring a setback distance by suitable gage means before starting injection molding cycles, said setback distance being measured from said parting line to at least one of said curved optically polished mold inserts surface facing into said mold cavity, and making an initial adjustment wherein a safety factor is added to this measured setback distance to assure there can be no contact between the pair of opposing curved optically polished mold inserts surface facing into said mold cavity; then, e. running at least one full cycle of said injection mold in said injection molding machine, thereby molding at least one of said lens;

f. measuring thickness of said lens and comparing the measured thinkness to a predetermined desired thinkness for said lens;

g. moving said means for adjustment as required, in order to make a corresponding adjustment to advance or retract said insert, running at least another full cycle of said injection mold, and measuring thickness of said lens and comparing the measured thickness to a predetermined desired thickness for said lens, and doing such iterations until the measured thickness and the predetermined desired thickness for said lens are within a predetermined tolerance of each other.

15. A method of claim 13 wherein said means for mechanically linkage of motions of said slideably mated pair of opposing wedge blocks and means for adjustment external to said injection mold and accessible to an operator for manual motion employs different marked or numbered position settings, the step of recording said marked position settings and/or quantifying numbered position settings so as to use the recorded settings to reproduce said settings at any future time.

16. A method of claim 13 with the additional steps of:

d. running at least one full cycle of said injection mold in said injection molding machine, thereby molding at least one of said lens;

e. measuring thickness of said lens and comparing the measured thickness to a predetermined desired thickness for said lens;

f. moving said means for adjustment as required, in order to make a corresponding adjustment to advance or retract said insert, running at least another full cycle of said injection mold, and measuring thickness of said lens and comparing the measured thickness to a predetermined desired thickness for said lens, and doing such iterations until the measured thickness and the predetermined desired thickness for said lens are within a predetermined tolerance of each other.

17. A method of claim 16 wherein the additional step of tightening said locking means for preventing slippage between said slideably mated pair of opposing wedge blocks by preventing relation of said threaded screw means for mechanical linkage follows the step of measuring thickness of said lens and comparing the measured thickness to a predetermined desired thickness for said lens.

* * * * *